US009391802B2

(12) United States Patent
George et al.

(10) Patent No.: US 9,391,802 B2
(45) Date of Patent: *Jul. 12, 2016

(54) RESOURCE CONFIGURATION CHANGE MANAGEMENT

(71) Applicant: International Business Machines Corporation, Armonk, NY (US)

(72) Inventors: Randy George, Austin, TX (US); Edith H. Stern, Somers, NY (US); Glen Tindal, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,682

(22) Filed: Jun. 30, 2015

(65) Prior Publication Data

US 2015/0304166 A1   Oct. 22, 2015

Related U.S. Application Data

(63) Continuation of application No. 13/460,848, filed on May 1, 2012, now Pat. No. 9,294,303, which is a continuation of application No. 13/174,579, filed on Jun. 30, 2011, now Pat. No. 9,288,074.

(51) Int. Cl.
  *H04L 12/46* (2006.01)
  *H04L 12/24* (2006.01)

(52) U.S. Cl.
  CPC .......... *H04L 12/4641* (2013.01); *H04L 41/085* (2013.01); *H04L 41/0813* (2013.01)

(58) Field of Classification Search
  USPC ........................................................ 709/224
  See application file for complete search history.

(56) References Cited

U.S. PATENT DOCUMENTS

| 7,287,069 B1 | 10/2007 | Kavasseri et al. |
| 7,392,300 B2 | 6/2008 | Anantharangachar et al. |

(Continued)

FOREIGN PATENT DOCUMENTS

| CN | 101540755 | 9/2009 |
| WO | 2006060276 A2 | 6/2006 |

OTHER PUBLICATIONS

Schoenwalder, J. et al., "Network configuration management using NETCONF and YANG", IEEE Communications Magazine, Sep. 2010, pp. 166-173.

(Continued)

*Primary Examiner* — Natisha Cox
(74) *Attorney, Agent, or Firm* — Jinesh Patel

(57) ABSTRACT

Prior to a first configuration change of a first resource, such as a network resource of a network, a processor determines a first performance metric of a second resource, such as a second network resource of the network. The first configuration change does not result in complete failure or fault of the second resource. Subsequent to the first configuration change of the first resource, the processor determines a second performance metric of the second resource and compares the second performance metric to at least one of the first performance metric and a service objective to yield comparison results. Based on the comparison results, the processor can cause a second configuration change of the first resource. The second configuration change of the first resource can revert a configuration of the first resource to its state prior to the first configuration change.

20 Claims, 5 Drawing Sheets

(56) References Cited

U.S. PATENT DOCUMENTS

| | | | |
|---|---|---|---|
| 7,822,718 B1 | 10/2010 | Wilson et al. | |
| 8,255,518 B2* | 8/2012 | Yahiro | G06F 11/3495 370/230 |
| 2004/0032837 A1 | 2/2004 | Visser | |
| 2006/0070033 A1* | 3/2006 | Care | G06F 11/008 717/124 |
| 2008/0104248 A1* | 5/2008 | Yahiro | G06F 11/3495 709/226 |
| 2008/0276119 A1* | 11/2008 | Barsness | G06F 9/50 714/4.1 |
| 2009/0150542 A1* | 6/2009 | Yahiro | G06F 11/3495 709/224 |
| 2010/0257513 A1 | 10/2010 | Thirumalai et al. | |
| 2011/0173350 A1* | 7/2011 | Coronado | G06F 13/385 710/8 |
| 2011/0302290 A1 | 12/2011 | Westerfeld et al. | |
| 2012/0030346 A1* | 2/2012 | Fukuda | G06F 11/0709 709/224 |
| 2012/0102160 A1* | 4/2012 | Breh | G06F 9/5061 709/220 |
| 2012/0137118 A1* | 5/2012 | Francois | G06F 9/44505 713/100 |
| 2013/0007258 A1 | 1/2013 | Stern et al. | |
| 2013/0007441 A1 | 1/2013 | Stern et al. | |

OTHER PUBLICATIONS

Non-final office action for U.S. Appl. No. 13/174,579 dated Feb. 15, 2013, 11 pp.
Final office action for U.S. Appl. No. 13/174,579 dated Jun. 17, 2013, 18 pp.
Non-final office action for U.S. Appl. No. 13/174,579 dated Jun. 20, 2014, 21 pp.
Notice of allowance for U.S. Appl. No. 13/174,579 dated Jan. 6, 2015, 10 pp.
Non-final office action for U.S. Appl. No. 13/460,848 dated Mar. 28, 2014, 11 pp.
Notice of allowance for U.S. Appl. No. 13/460,848 dated Jan. 7, 2015, 10 pp.
Notice of allowance for U.S. Appl. No. 13/174,579 dated Apr. 8, 2015, 9 pp.
Notice of allowance for U.S. Appl. No. 13/460,848 dated Apr. 20, 2015, 8 pp.

* cited by examiner

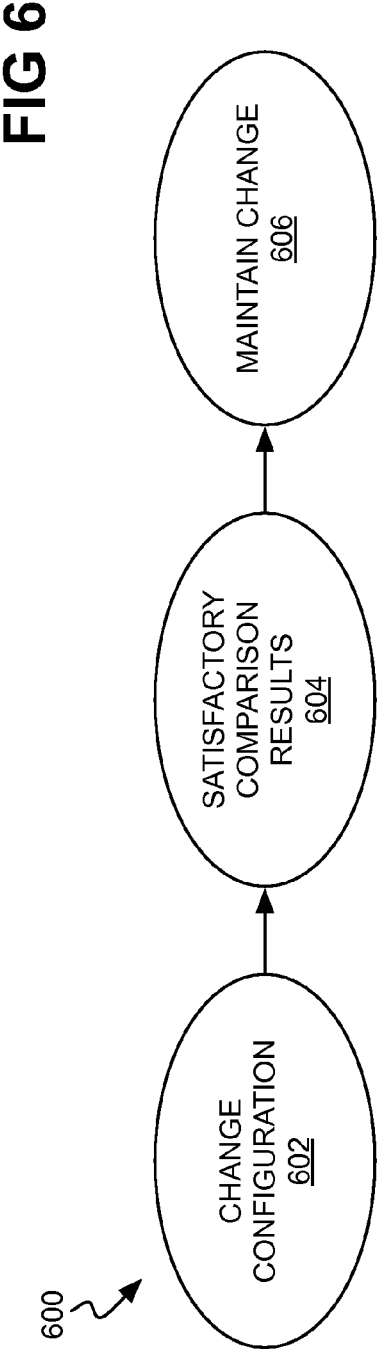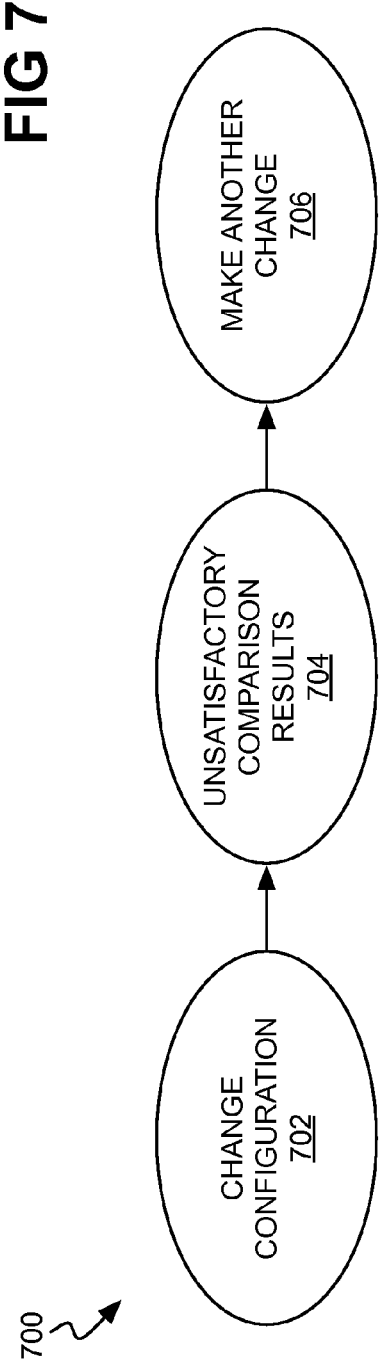

RESOURCE CONFIGURATION CHANGE MANAGEMENT

BACKGROUND

Computing and other types of devices are commonly communicatively interconnected with one another over a network. Examples of such networks include the Internet, intranets, extranets, virtual private networks (VPNs), wired networks, wireless networks, and telephony networks, among other types of networks. In the simplest networking topology, two or more devices may be communicatively interconnected with one another directly, or through a single device like a hub, router, or switch. However, with the increasing usage of networks, typically a large number of devices are communicatively interconnected with one another within a network through a complex topology of such devices like hubs, routers, and switches.

SUMMARY

A method of an embodiment of the disclosure includes, prior to a first configuration change of a first resource, a processor determining a first performance metric of a second resource. The method includes subsequent to the first configuration change of the first resource, the processor determining a second performance metric of the second resource. The method includes the processor comparing the second performance metric to at least one of a service objective and the first performance metric, to yield comparison results. Based on the comparison results, the method includes the processor causing a second configuration change of the first resource. The first configuration change does not result in complete failure or fault of the network resource.

A computer program product of an embodiment of the disclosure includes a computer-readable storage medium embodying computer-readable code. A processor executes the computer-readable code. The computer-readable code includes first computer-readable code to determine a first performance metric of a second network resource of a network prior to a first configuration change of a first network resource of the network, and to determine a second performance metric of the second network resource subsequent to the first configuration change. The computer-readable code includes second computer-readable code to compare the second performance metric to at least one of a service objective and the first performance metric to yield comparison results. Based on the comparison results, the second computer-readable code is to maintain the first configuration change of the first network resource, or cause a second configuration change of the first network resource. The first configuration change does not result in complete failure or fault of the second network resource.

A system of an embodiment of the disclosure includes a first network resource of a network to which at least a first configuration change is to be made. The system includes a second network resource of the network. The system includes a device to determine a first performance metric of the second network resource and a second performance metric of the second network resource, and to compare the second performance metric to at least one of a service objective and the first performance metric to yield comparison results. The device is to, based on the comparison results, maintain the first configuration change of the first network resource, or cause a second configuration change of the first network resource. The device determines the first performance metric prior to the first configuration change of the first network resource, and determines the second performance metric subsequent to the second configuration change of the first network resource. The first configuration change does not result in complete failure or fault of the second network resource.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIGS. 6 and 7 are process diagrams illustratively depicting two scenarios in which the method of FIG. 2 is operative, according to an embodiment of the disclosure.

DETAILED DESCRIPTION

Figure 1:
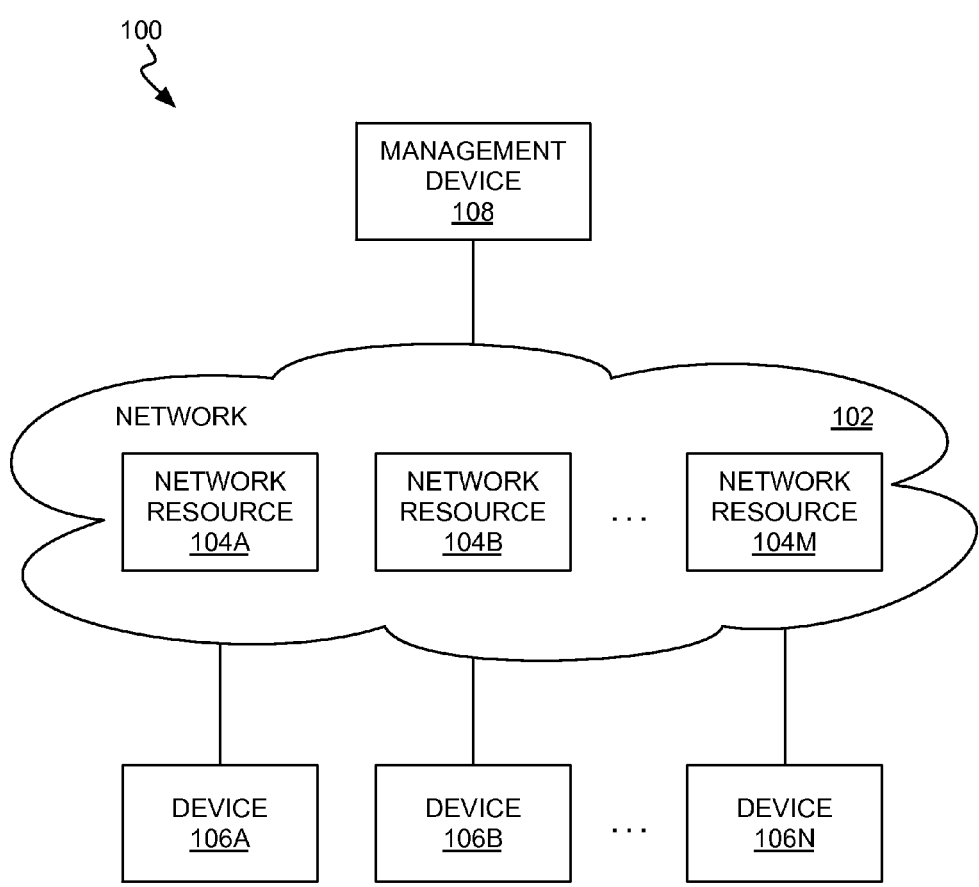
FIG. 1 is a diagram of a system including a network of network resources, according to an embodiment of the disclosure.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, networks can be relatively complex, including a number of devices such as hubs, switches, and routers, which are generically referred to as network resources herein, to interconnect a number of computing and other types of devices. Due to the complexity of networks, the configurations of the network resources may require periodic modification. Sometimes these configuration changes can cause unintended consequences, such as causing a performance metric of a particular network resource to degrade, even where this particular network resource is not the network resource that was the subject of the configuration change.

Existing network problem detection approaches, however, only focus on detecting the complete failure or fault of a network resource. For instance, when a network resource fails completely, existing techniques can detect and report this problem to a network administrator or other personnel, or can perform an appropriate remediative action, such as routing data packets around the failed resource. However, more problematic is the situation where a complete failure or fault of a network resource does not occur, but rather the performance of the network resource suffers due to a configuration change to the same or different resource.

In such scenarios, presently network administrators can only detect such degradation when, for instance, customers or end users begin complaining that network performance has decreased. By the time such complaints arrive, however, a network administrator may long have forgotten the network configuration that ultimately was responsible for the performance degradation, especially when the degradation is slight or intermittent, making it difficult for the administrator to troubleshoot such problems. Furthermore, the network administrator may have made a number of network configurations change in the interim, requiring the network administrator manually determine which configuration change actually caused the performance degradation.

The techniques disclosed herein overcome these difficulties. Prior to the configuration change of a network resource of a network, a processor can determine the performance metric of the same or different network resource. Subsequent to the configuration change, the processor determines another performance metric. The processor compares these two performance metrics to one another. Based on this comparison, the processor can either maintain the configuration change, or make another, different configuration change. For example, the processor may roll back the original configuration change, so that a network user can perform further analysis and investigation to determine why the contemplated configuration change is causing performance degradation.

This process can occur in an automated manner. For instance, each time a network administrator plans a configuration change of a network resource, the processor may automatically measure a performance metric both before and after this change. The processor may subsequently perform an automated comparison of the two performance metric measurements, and issue a notification to the network administrator or other user if the processor has detected decreased performance. By comparison, if the processor does not detect a performance decrease, or if performance has improved, then the processor may not even notify the user in question, and the user in question may not even be aware, that the processor measured and compared performance metrics.

FIG. 1 shows a system 100, according to an embodiment of the disclosure. The system 100 includes a network 102. The network 102 can be or include the Internet, intranets, extranets, virtual private networks (VPNs), wired networks, wireless networks, and telephony networks, among other types of networks. The network 102 includes of network resources 104A, 104B, . . . , 104M, which are collectively referred to as the network resources 104. Examples of network resources 104 include hubs, switches, and routers, among other types of network resources.

The system 100 includes other devices 106A, 106B, . . . , 106N, collectively referred to as the devices 106. The devices 106 are communicatively connected to one another over the network 102. The devices 106 can include client devices and server devices. Examples of such devices 106 include computing devices, such as desktop and laptop computers, smartphones, and other types of devices 106.

The system can further include a management device 108. The management device 108 may be a computing device, and as such may be one of the devices 106. However, when present, the management device 108 performs configuration of the network resources 104, such as by permitting a network administrator or other user to perform such configuration. However, one or more of the network resources 104 may alternatively perform this functionality themselves.

In general operation, the management device 108 effects a configuration change to one of the network resources 104. The management device determines performance metrics of the same or different network resource 104, such as by measuring or receiving these metrics, both prior to and subsequent to the configuration change occurring. The management device 108 compares the performance metrics to one another, and on this basis either maintains the configuration change, or makes another configuration change to the network resource 104 in question. For instance, the second configuration change may roll back the first configuration changed such that the configuration of the network resource 104 reverts to its original state. In one embodiment, the management device 108 compares the second performance metric to a service objective, and responsive to the comparison, makes another configuration change to the network resource 104 in question.

Figure 2:
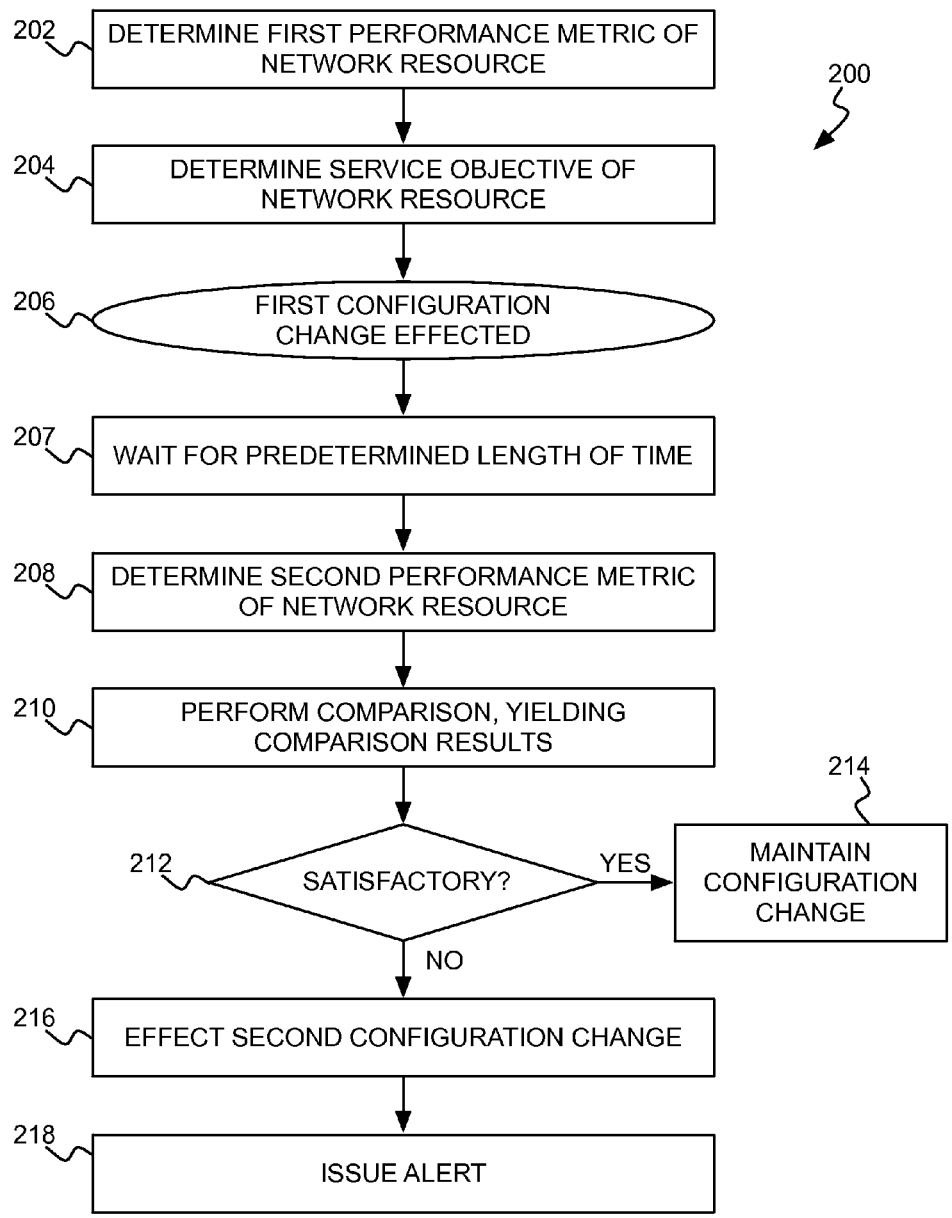
FIG. 2 is a flowchart of a method for managing configuration changes to network resources of a network, according to an embodiment of the disclosure.

FIG. 2 shows a method 200 that describes this operative process in detail, according to an embodiment of the disclosure. A processor of a device can perform the method 200. The device may be the management device 108, one of the network resources 104, and/or another device.

The detailed description explains the method 200 in relation to the processor making a configuration change to the network resource 104A, and then determining the effects of this change to the network resource 104A by monitoring a performance metric of the network resource 104B both before and after this change. However, alternatively, the processor can both make the configuration change to determine the effects of this change to the same network resource 104A. That is, the processor can determine the effects of a configuration change to the network resource on the same resource 104A, or on a different network resource 104B, although the detailed description explains the method 200 in relation to the latter. While this description has presented an example where the same processor makes the configuration change as well as monitoring the performance metrics, in other embodiments, the processor which monitors performance may be separate.

The processor may monitor the performance metrics within windows of time. For instance, the performance metric may specify an average, maximum, or minimum of measurements that the processor takes during a particular window of time. This average, maximum, or minimum of the measurements is thus the performance metric in this embodiment.

The configuration change that the processor makes to the network resource 104A is generally a change in the networking configuration of the network resource 104A. For instance, the processor may update the routing paths or the routing tables of the network resource 104A. Other types of configuration changes that the processor may make to the network resource 104 include which network traffic to permit and which network traffic to block, as well as changes in quality or class of service policies, among other types of configuration changes.

Prior to the configuration change being effected to the network resource 104A, the processor determines a first performance metric of the network resource 104B (202). For instance, when a user of the management device requests the processor to make a networking configuration change to the network resource 104A, the processor performs part 202 to determine the first performance metric before the processor makes this configuration change. Alternatively, the processor may periodically perform part 202 so that processor monitors the first performance metric over time, such that the processor already knows the first performance metric before when the configuration change.

The processor may receive the first performance metric from the network resource 104B, when the network resource 104B has built-in monitoring capabilities. Alternatively, the processor may receive the first performance metric from the management device 108 that measures the network resource 104B. The performance metric can include such varied characteristics and parameters as throughput, including average throughput and worst throughput, as well as latency and jitter, among other types of performance metrics.

The processor may determine the first performance metric, as well as a second performance metric as presented later in the detailed description, in a number of different ways. As noted above, the processor may receive a performance metric. The processor may also receive inputs of various types, on which basis the processor calculates the performance metric. The processor may indeed calculate the performance metric based on received metrics associated with more than one resource, as well as request the performance metric from a resource.

In one embodiment, the processor may also determine a service objective associated with the network resource 104B (204). The service objective specifies how the network resource 104B should perform. For instance, the service objective may include a specified average throughput, a specified worst throughput, and so on, which the network resource 104B is to satisfy. In another example, the service objective may pertain to a service such as a virtual local-area network (VLAN), in which the network resource 104B contributes to the service. The service objective desirably relates to the same characteristic or parameter as the performance metric does, and as such corresponds to the performance metric.

The processor can determine the service objective in a number of different ways. The processor may receive the service objective as a user has specified, or as a particular policy, service profile, or rules that govern the network resource 104B have specified. The service objective may be received from the network resource 104B itself. The processor may receive the service objective from a networking service that runs on or that utilizes the network resource 104B.

Once the processor has determined the first performance metric of the network resource 104B and optionally the service objective of the resource 104B, the processor effects the first configuration change to the network resource 104A (206). The processor performs subsequent parts 207, 208, 210, 212, 214, and/or 216 of the method 200 after making the configuration change. First, the processor may wait a predetermined length of time (207).

The networking resource 104B may not realize the effects of the first change to the network resource 104A until a length of time has elapsed after the processor has made this change. Therefore, the processor waits for the predetermined length of time in part 207 to ensure that when the processor determines a second performance metric of the network resource 104B, this second performance metric reflects the configuration change that the processor made to the network resource 104A. This wait is thus purposeful, and is not an inadvertent byproduct of various delays that may otherwise occur between the processor performing parts 206 and 208.

The processor then determines the second performance metric of the network (208). The second performance metric corresponds to the first performance metric that the processor determined prior to the configuration change, in that the same characteristic or parameter is the subject of both performance metrics. For instance, if average throughput is the subject of the first performance metric, then average throughput is likewise the subject of the second performance metric. The processor can determine the second performance metric of the network resource 104B in the same way that the processor determined the first performance metric of the resource 104B.

The processor compares the second performance metric to the first performance metric and/or to the service objective to yield comparison results (210). If the processor did not previously determine the service objective of the network resource 104B, then the processor may compare the second performance metric just to the first performance metric. The first performance metric may be A, and the second performance metric may be B. Therefore, as a first example, the comparison results may indicate improvement and be satisfactory where the second performance metric exceeds the first performance metric, i.e., where B>A. Similarly, as a second example, the comparison results may indicate degradation and be unsatisfactory where the second performance metric is lower than the first performance metric, i.e., where A<B.

Figure 3:
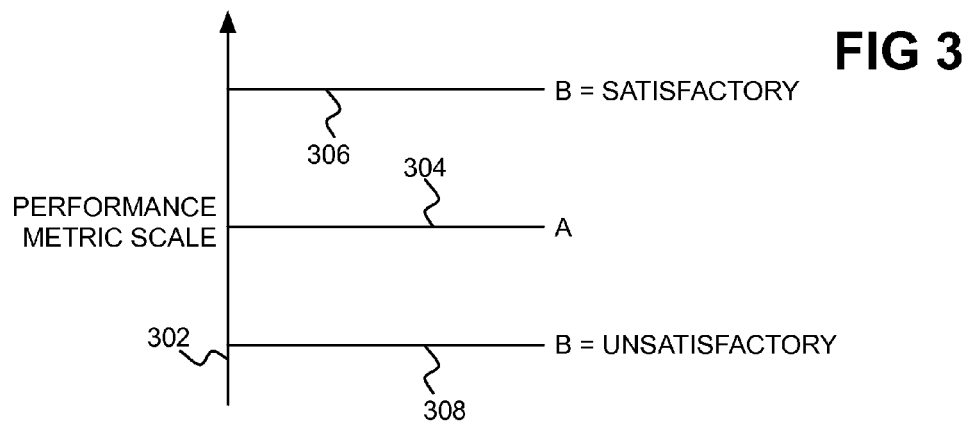
FIGS. 3, 4, and 5 are diagrams illustratively depicting exemplary performance of parts of the method of FIG. 2, according to varying embodiments of the disclosure.

FIG. 3 illustratively depicts these two examples of comparing the two performance metrics, according to an embodiment of the disclosure. A directional line 302 indicates the performance metric scale. Higher performance metric values along the performance metric scale correspond to better performance than lower performance metric values do. A line 304 indicates the first performance metric A.

In the first example, a line 306 indicates the second performance metric B. Because the line 306 is higher along the directional line 302 that indicates the performance metric scale than the line 304 indicating the first performance metric A is, comparing the second performance metric B to the first performance metric A indicates improvement. Therefore, the comparison results are satisfactory.

In the second example, a line 308 indicates the second performance metric B. Because the line 308 is lower along the directional line 302 that indicates the performance metric scale than the line 304 indicating the first performance metric A is, comparing the second performance metric B to the first performance metric A indicates degradation. Therefore, the comparison results are unsatisfactory.

Referring back to part 210 of the method 200 in FIG. 2, if the processor previously determined the service objective of the network resource 104B, then the processor may compare the second performance metric either to the service objective, to the first performance metric, or to both the first performance metric and the service objective. For instance, the service objective may specify a minimum value of X, and the first performance metric may be A, as before, where A>X. As a third example, the second performance metric may be B such that A>B>X. Although performance has degraded, the degradation did not result in the second performance metric B failing to meet the service objective X. As a fourth example, the second performance metric may instead be B such that A>X>B. As such, performance has degraded to a sufficient degree that the second performance metric B does not satisfy the service objective X.

Figure 4:
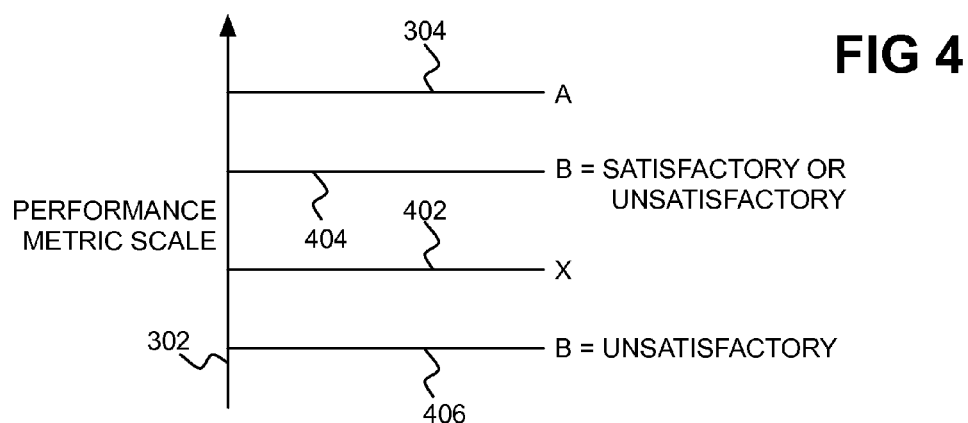

FIG. 4 illustratively depicts these two examples of comparing the second performance metric to the first performance metric and/or to the service objective, according to an embodiment of the disclosure. The directional line 302 indicates the performance metric scale in FIG. 4, as in FIG. 3. The line 304 indicates the first performance metric A in FIG. 4 as well, also as in FIG. 3. A line 402 indicates the service objective X. Because the line 302 is higher along the directional line 304 than the line 402, the first performance metric A exceeds the service objective X such that A>X.

In the third example, a line 404 indicates the second performance metric B. The line 404 is lower along the directional line 302 that indicates the performance metric scale than the line 304 indicating the first performance metric A, which means that performance has degraded. However, the line 404 is still higher along the directional line 302 than the line 402 that indicates the service objective X, which means that the second performance metric B nevertheless still satisfies the service objective X. Therefore, comparing the second performance metric B to just the first performance metric A yields comparison results that are unsatisfactory, since B<A. Comparing the second performance metric B to just the service objective X yields comparison results that are satisfactory, since B>X. However, comparing the second performance metric B to both the service objective X and the first performance metric A yields comparison results that are unsatisfactory, since B>X but B<A.

In the fourth example, a line 406 indicates the second performance metric B. The line 406 is lower along the directional line 302 that indicates the performance metric scale than the line 304 indicating the first performance metric A, which means that performance has degraded. The line 406 is also lower along the directional line 302 than the line 402 that indicates the service objective X, which means that the second performance metric B also does not satisfy the service objective X. Therefore, comparing the second performance metric B to either or both the first performance metric A and the service objective X yields comparison results that are unsatisfactory, since B<A and B<X.

The third and fourth examples show that even when the second performance metric B corresponds to degraded performance compared to the first performance metric A, the comparison results may nevertheless be either satisfactory or unsatisfactory. In the third example, because the second performance metric B is still greater than the service objective X, the comparison results can nevertheless be satisfactory even though the second performance metric B is less than the first performance metric A. By comparison, in the fourth example, the comparison results are always unsatisfactory because the second performance metric B is less than both the first performance metric A and the service objective X.

Referring back to part 210 of the method 210 in FIG. 2, as a fifth example, the first performance metric A and the second performance metric B may instead be such that A<B<X, where as before the service objective specifies a minimum value of X. In this case, performance has improved, but the improvement did not result in the second performance metric B satisfying the service objective X. However, as a sixth example, if the first performance metric and the second performance metric are such that A<X<B, then performance has improved sufficiently such that the second performance metric B satisfies the service objective X.

Figure 5:
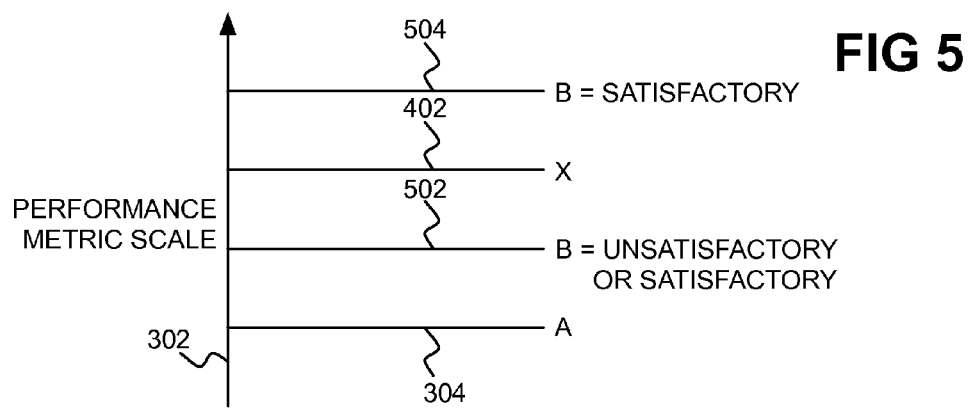

FIG. 5 illustratively depicts these two examples of comparing the second performance metric to both the first performance metric and the service objective, according to an embodiment of the disclosure. The directional line 302 indicates the performance metric scale in FIG. 5, as in FIGS. 3 and 4. The line 304 indicates the performance metric A in FIG. 5 as well, also as in FIGS. 3 and 4. The line 402 indicates the service objective X in FIG. 5, as in FIG. 4. Because the line 302 is lower along the directional line 304 than the line 402, the first performance metric A fails to satisfy the service objective X such that A<X.

In the fifth example, a line 502 indicates the second performance metric B. The line 502 is higher along the directional line 302 that indicates the performance metric scale than the line 304 indicating the first performance metric A, which means that performance has improved. However, the line 502 is still lower along the directional line 302 than the line 402 that indicates the service objective X, which means that the second performance metric B nevertheless still does not satisfy the service objective X. Therefore, comparing the second performance metric B to just the first performance metric A yields comparison results that are satisfactory, since B>A. However, comparing the second performance metric B to just the service objective X yields comparison results that are unsatisfactory, since B<X. Similarly, comparing the second performance metric B to both the service objective X and the first performance metric A yields comparison results that are unsatisfactory, since B>A but B<X.

In the sixth example, a line 504 indicates the second performance metric B. The line 504 is higher along the directional line 302 that indicates the performance metric scale than the line 304 indicating the first performance metric A, which means that performance has improved. The line 504 is also higher along the directional line 302 than the line 402 that indicates the service objective X, which means that the second performance metric B further satisfies the service objective X. Therefore, comparing the second performance metric B to either or both the first performance metric A and the service objective X yields comparison results that are satisfactory, since B>A and B>X.

The fifth and sixth examples show that even when the second performance metric B corresponds to improved performance compared to the first performance metric A, the comparison results may be nevertheless be either unsatisfactory or satisfactory. In the fifth example, because the performance metric B is still less than the service objective X, the comparison results can nevertheless be unsatisfactory even though the second performance metric B is greater than the first performance metric A. By comparison, in the sixth example, the comparison results are always satisfactory, because the performance metric B is greater than both the first performance metric A and the service objective X.

Referring back to FIG. 2, if the comparison results are satisfactory (212), then the processor maintains the configuration change that it has made to the network resource 104A (214). However, if the comparison results are unsatisfactory (212), then the processor effects a second configuration change to the network resource 104A (216). The second configuration change may revert the network resource 104A back to its state prior to the first configuration change. Stated colloquially, the processor "undoes" or "rolls back" the first configuration change by effecting the second configuration change. Alternatively, the processor may make a different type of second configuration change to the network resource 104A to adjust the state of the network resource 104A, but not rollback the network resource 104A to its state prior to the first configuration change.

The processor may also issue a performance degradation alert (218). The performance degradation alert notifies a user, such as a network administrator, that the first configuration change of the network resource 104A that the processor effected has resulted in an undue performance degradation in some respect in relation to the network resource 104B. As such, the user can perform an analysis as to why this occurred, especially where the effect on the network resource 104B is an unintended consequence of the change that the processor made to the network resource 104A.

However, where the comparison results are satisfactory, such that the processor maintains the first configuration change in part 214, the processor may not notify the user at all that the processor determined the performance metric of the network resource 104B in parts 202 and 208, nor that the processor performed a comparison in part 210, and so on. In this and other respects, the processor performs the method 200 in an automated manner to monitor and manage configuration changes to the network resource 104A. The processor thus notifies the user, and makes a second configuration change to the network resource 104A, in one embodiment only when the comparison results are unsatisfactory.

Implementation of embodiments of the method 200 can occur in a number of different ways. For instance, in one implementation, the processor determines the performance metric of the network resource 104B in parts 202 and 208 by using the Tivoli® Netcool® Performance Manager product available from International Business Machines Corporation ("IBM") of Armonk, N.Y., where Tivoli® and Netcool® are registered trademarks of IBM. In one implementation, the processor determines that a configuration change to the network resource 104A is imminent, presaging the performance of the method 200, by monitoring such configuration change requests using the Tivoli® Netcool® Configuration Manager product available from IBM. Likewise, in one embodiment, the processor effects the first configuration change in part 206 and the second configuration change in part 216, where the latter may involve a rollback of the former, by using the Tivoli® Netcool® Configuration Manager product.

FIGS. 6 and 7 show process diagrams 600 and 700, respectively, which summarize the process of the method 200 in two different scenarios, according to an embodiment of the disclosure. In the first scenario of FIG. 6, the processor makes a configuration change (602), and determines that the comparison results resulting therefrom are satisfactory (604). As such, the processor maintains this configuration change (606).

By comparison, in the second scenario of FIG. 7, the processor still makes a configuration change (702). However, the processor then determines that the comparison results resulting from the configuration are unsatisfactory (704). Therefore, the processor makes another change to the configuration (706), instead of just maintaining the original configuration change as in the first scenario of FIG. 6.

Figure 8:
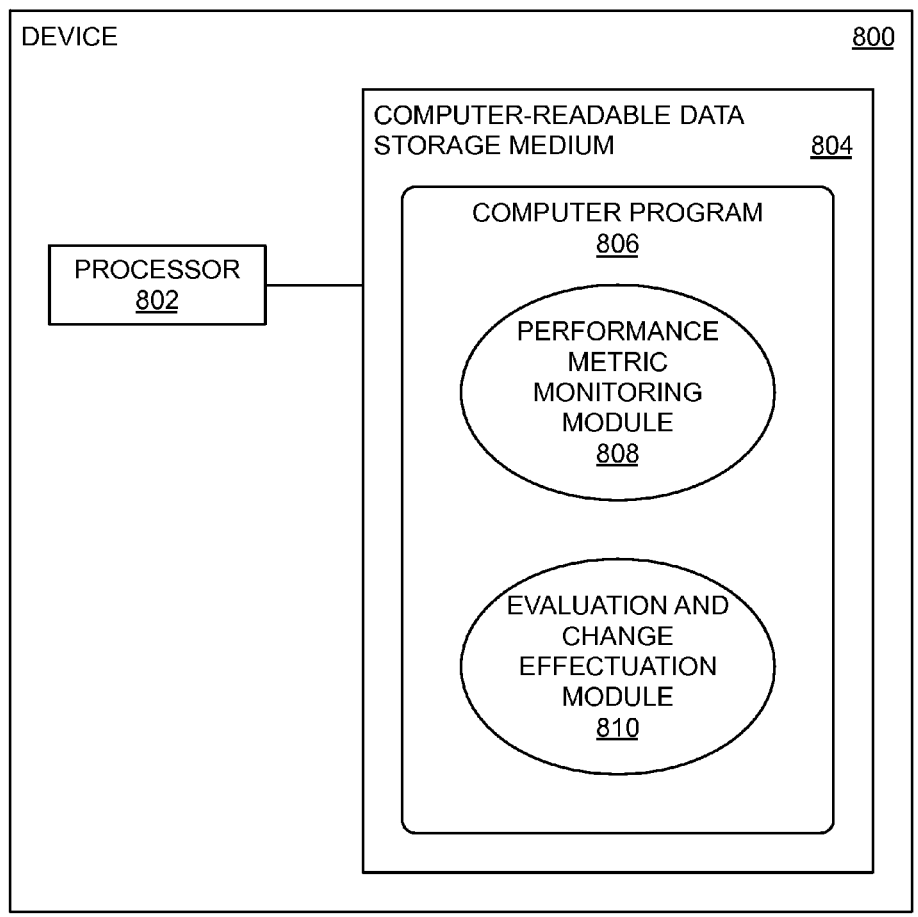
FIG. 8 is a diagram of a device for managing configuration changes to network resources of a network, according to an embodiment of the disclosure.

FIG. 8 shows a device 800 that can perform the method 200, according to an embodiment of the disclosure. The device 800 can thus implement or instantiate the management device 108, one or more of the network resources 104, and so on. The device 800 includes at least a processor 802 and a computer-readable data storage medium 804. Examples of the latter include volatile and non-volatile such media, magnetic media, optical media, and/or semiconductor media, among other types of computer-readable data storage media.

The computer-readable data storage medium 804 stores a computer program 806 that the processor 802 executes to perform the method 200. In particular, the computer program 806 includes two modules 808 and 810. Computer-readable code can implement each of the modules 808 and 810. The module 808 is a performance metric monitor module that monitors the performance of a network resource 104. As such, the processor 802 can execute the module 808 to perform parts 204 and 208 of the method 200. By comparison, the module 810 is an evaluation and change effectuation module that determines whether the processor 802 should make a subsequent configuration change to a network resource 104 based on the performance metrics of the same or different resource 104. As such, the processor 802 can execute the module 808 to perform parts 204, 210, 212, 214, 216, and/or 218 of the method 200.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processor of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

The detailed description has presented examples that pertain to resources that are specifically network resources. However, other embodiments of the disclosure can pertain to other types of resources, such as other types of computing resources. Examples of computing resources including server computing devices and other types of computing devices, for instance, as well as other types of computing resources more generally.

We claim:

1. A method comprising:
only in response to a user indicating that a first configuration change is to be made to a first network resource and not to a second resource, determining before the first configuration change is made to the first network resource and not to the second resource, a first performance metric of only the second network resource of a network prior to the first configuration change, such that the first performance metric is not determined until the user has indicated that the first configuration change is to be made, and determining, after the first configuration change has been made and then after purposefully waiting for a length of time, a second performance metric of only the second network resource subsequent to the first configuration change of the first network resource;
comparing the second performance metric to at least one of a service objective and the first performance metric to yield comparison results; and
based on the comparison results, performing one of:
maintaining the first configuration change of the first network resource;
causing a second configuration change of the first network resource,
wherein the first configuration change does not result in complete failure or fault of the second network resource,
wherein the second network resource is not a subject of the first configuration change,
wherein the comparison results indicate whether the second network resource has been adversely affected as a result of the first configuration change to just the first network resource,
wherein the first network resource is part of a different device than the second network resource,
and wherein determining the first performance metric responsive to the user indicating that the first configuration change is to be made and determining the second performance metric subsequent to the first configuration change permits determination of whether the second network resource has been adversely affected as a result of the first configuration change.

2. The method of claim 1, further comprising:
determining the service objective associated with the second network resource; and
comparing the second performance metric to both the first performance metric and the service objective to yield the comparison results.

3. The method of claim 1, further comprising:
maintaining the first configuration change of the first network resource where the second performance metric better satisfies the service objective than the first performance metric does; and
causing the second configuration change of the first network resource where the second performance metric does not better satisfy the service objective than the first performance metric does.

4. The method of claim 1, further comprising:
maintaining the first configuration change of the first network resource where the second performance metric is better than the first performance metric; and
causing the second configuration change of the first network resource where the second performance metric is worse than the first performance metric.

5. The method of claim 1, wherein the second configuration change of the first network resource reverts a configuration of the first network resource to a state prior to the first configuration change having been made.

6. The method of claim 1, further comprising:
explicitly and just in response to a user indicating that the first configuration change should be performed, automatically and without user interaction determining the first performance metric prior to permitting the first configuration change to be applied.

7. The method of claim 1, further comprising:
subsequent and responsive to, and commencing at a time of, the first configuration change of the first network resource, purposefully waiting for a predetermined length of time, prior to determining the second performance metric of the second network resource.

8. A computer program product comprising:
a computer-readable storage medium having computer-readable code embodied therein, the computer-readable code executable by a processor, the computer-readable code comprising:
first computer-readable code to, only in response to a user indicating that a first configuration change is to be made to a first network resource and not to a second resource, determine before the first configuration change is made to the first network resource and not to the second resource, a first performance metric of only the second network resource of a network prior to the first configuration change, such that the first performance metric is not determined until the user has indicated that the first configuration change is to be made, and to determine, after the first configuration change has been made and then after purposefully waiting for a length of time, a second performance metric of only the second network resource subsequent to the first configuration change of the first network resource; and
second computer-readable code to compare the second performance metric to at least one of a service objective and the first performance metric to yield comparison results, and to based on the comparison results perform one of:
maintain the first configuration change of the first network resource;
cause a second configuration change of the first network resource,
wherein the first configuration change does not result in complete failure or fault of the second network resource, wherein the second network resource is not a subject of the first configuration change,
wherein the comparison results indicate whether the second network resource has been adversely affected as a result of the first configuration change to just the first network resource, wherein the first network resource is part of a different device than the second network resource,
and wherein determination of the first performance metric responsive to the user indicating that the first configuration change is to be made and determining the second performance metric subsequent to the first configuration change permits determination of whether the second network resource has been adversely affected as a result of the first configuration change.

9. The computer program product of claim 8, wherein the processor is part of a device other than the first network resource and the second network resource.

10. The computer program product of claim 8, wherein the second computer-readable code is further to determine the service objective associated with the second network resource, and is further to compare the second performance metric to both the first performance metric and the service objective to yield the comparison results.

11. The computer program product of claim 8, wherein the second computer-readable code is to maintain the first configuration change of the first network resource where the second performance metric better satisfies the service objective than the first performance metric does,
and wherein the second computer-readable code is to cause the second configuration change of the first network resource where the second performance metric does not better satisfy the service objective than the first performance metric does.

12. The computer program product of claim 8, wherein the second computer-readable code is to maintain the first configuration change of the first network resource where the second performance metric is better than the first performance metric,
and wherein the second computer-readable code is to cause the second configuration change of the first network resource where the second performance metric is worse than the first performance metric.

13. The computer program product of claim 8, wherein the second configuration change of the first network resource reverts a configuration of the first network resource to a state prior to the first configuration change having been made.

14. The computer program product of claim 8, wherein explicitly and just in response to a user indicating that the first configuration change should be performed, the first computer-readable code automatically and without user interaction determines the first performance metric prior to permitting the first configuration change to be applied.

15. The computer program product of claim 8, the first computer-readable code is to, subsequent and responsive to, and commencing at a time of, the first configuration change of the first network resource, purposefully wait for a predetermined length of time, prior to determining the second performance metric of the second network resource.

16. A system comprising:
a first network resource of a network;
a second network resource of the network, a first configuration change to be made to the first network resource and not to the second network resource, the second network resource part of a different device than the first network resource; and,
a device to, only in response to a user indicating that the first configuration change of the first network resource should be performed, determine before the first configuration change is made to the first network resource and not to the second resource, a first performance metric of only the second network resource, such that the first performance metric is not determined until after the user has indicated that the first performance metric is to be made, and determine, after the first configuration change has been made and then after purposefully waiting for a length of time, a second performance metric of only the second network resource, to compare the second performance metric to at least one of a service objective and the first performance metric, yielding comparison results, and based on the comparison results to perform one of:
maintain the first configuration change of the first network resource;
cause a second configuration change of the first network resource, wherein the first configuration change does not result in complete failure or fault of the second network resource, wherein the second network resource is not a subject of the first configuration change, wherein the comparison results indicate whether the second network resource has been adversely affected as a result of the first configuration change to just the first network resource, and wherein determination of the first performance metric responsive to the user indicating that the first configuration change is to be made and determining the second performance metric subsequent to the first configuration change permits determination of whether the second network resource has been adversely affected as a result of the first configuration change.

17. The system of claim 16, wherein the second configuration change of the first network resource reverts a configuration of the first network resource to a state prior to the first configuration change having been made.

18. The system of claim 16, wherein explicitly in response to a user indicating that the first configuration change should be performed, the device automatically and without user interaction determines the first performance metric prior to permitting the first configuration change to be applied, and wherein the device determines the second performance metric automatically and without user interaction subsequent to the first configuration change having been applied.

19. The system of claim 16, wherein the device maintains the first configuration change without notifying the user if the comparison results do not indicate performance degradation such that where the comparison results do not indicate performance degradation the user is never notified that the first performance metric and the second performance metric have been determined and compared to one another, and wherein the device notifies the user if the comparison results indicate degradation and indication of the second configuration change that should be applied is received from the user prior to the second configuration change being applied.

20. The system of claim 16, wherein no monitoring of the first network resource is performed, such that no performance metric of the first network resource is made or occurs, and wherein just two performance metrics of the second network resource are determined, the two performance metrics being the first performance metric and the second performance metric.

* * * * *